C. A. STAPLETON & O. P. BURCHFIEL.
GAS ENGINE.
APPLICATION FILED JAN. 28, 1914.
1,143,736.
Patented June 22, 1915.
2 SHEETS—SHEET 2.
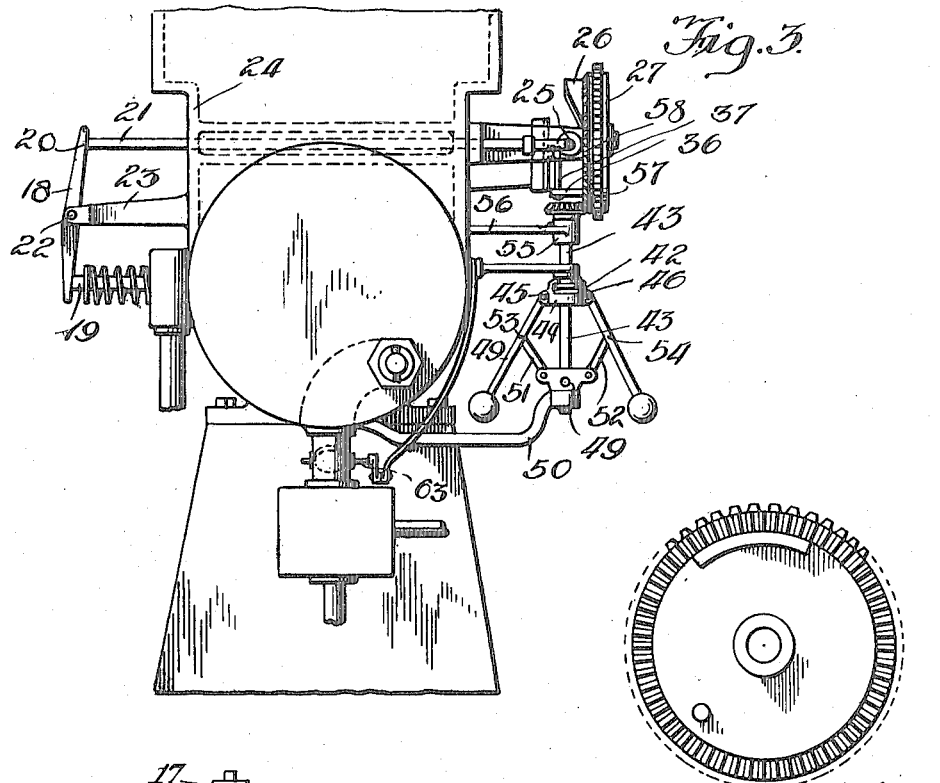
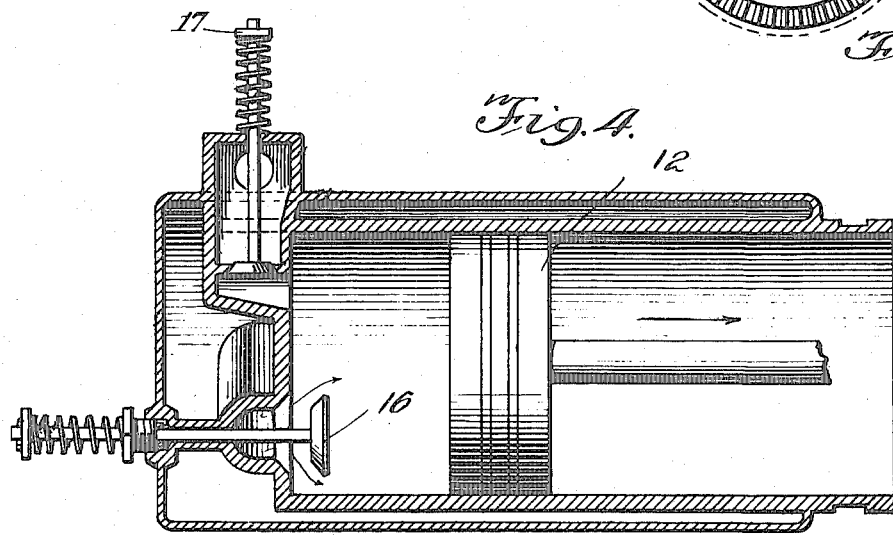
Witnesses
Inventors
C. A. Stapleton
O. P. Burchfiel
By
Attorneys

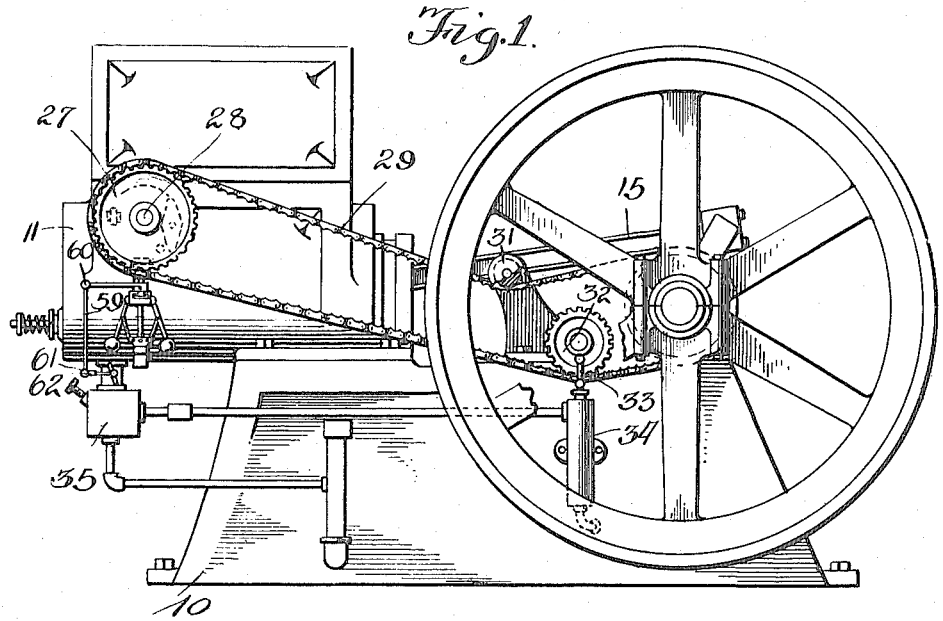
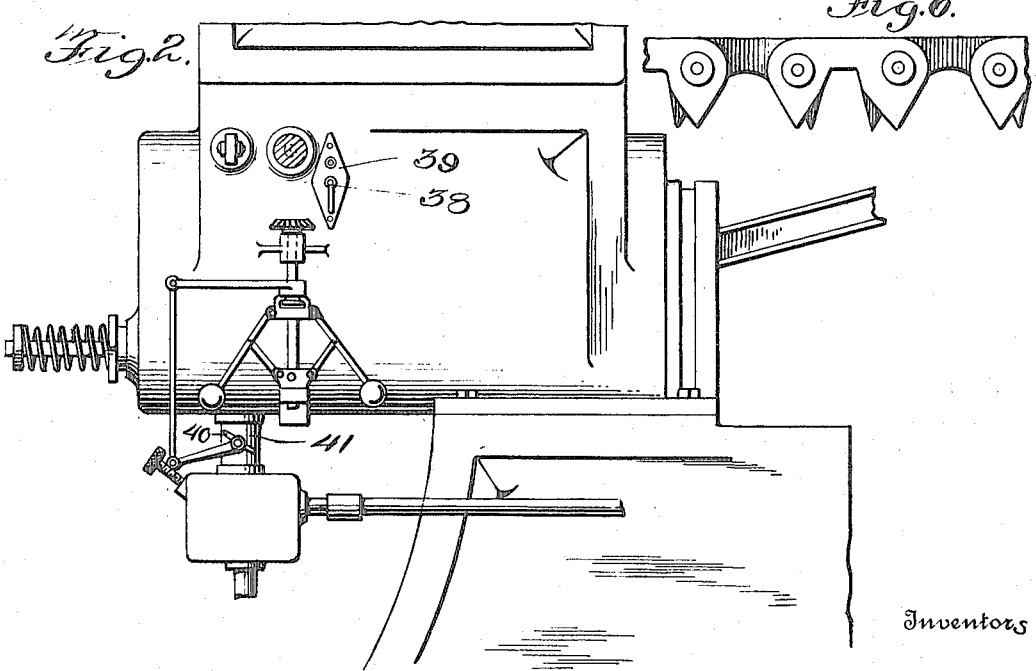

UNITED STATES PATENT OFFICE.

CHARLES A. STAPLETON AND OTHA P. BURCHFIEL, OF ANTHONY, KANSAS.

GAS-ENGINE.

1,143,736.   Specification of Letters Patent.   Patented June 22, 1915.

Application filed January 28, 1914. Serial No. 814,868.

*To all whom it may concern:*

Be it known that we, CHARLES A. STAPLETON and OTHA P. BURCHFIEL, citizens of the United States, residing at Anthony, in the county of Harper and State of Kansas, have invented certain new and useful Improvements in Gas-Engines, of which the following is a specification.

This invention relates to gas engines, and has particular reference to improvements in valve controlling mechanism.

As its principal object, the present invention aims to provide simple and efficient controlling mechanism for the valves, and to further provide in connection therewith a make and break igniter whereby the ignition of the gases may be controlled by the valve mechanism.

A further object of the invention is to provide a governor controlled regulator for the butterfly valve of the intake manifold, and to operatively connect the governor with a cam faced gear wheel or pinion which, in the preferred embodiment, is employed in controlling the rocker arms connected to both the valves and igniter.

An object of equal importance with the foregoing is to provide a novel form of a stub shaft for the cam faced gear constructed and arranged in such manner that the shifting of a single lever will simultaneously change the relation of the moment of the intake of the gas and the spark to the position of the piston.

The above and additional objects are accomplished by such means as are illustrated in the accompanying drawings, described in the following specification and then more particularly pointed out in the claims which are appended hereto and form a part of this application.

With reference to the drawings, wherein I have illustrated the preferred embodiment of my invention as it is reduced to practice, and throughout the several views of which similar reference numerals designate corresponding parts, Figure 1 is a side elevation with the various parts of the invention in operative assembled position; Fig. 2 is a detail view in side elevation with the cam faced gear removed; Fig. 3 is an end view looking toward the cylinder head; Fig. 4 is a longitudinal section taken through the cylinder and illustrating particularly the arrangement of the inlet and exhaust valves; Fig. 5 is a detail face view of the cam gear; Fig. 6 is a detail view of the preferred form of a silent chain employed in operatively connecting the operating gears with the crank shaft of the engine.

As shown in the accompanying drawings, the preferred embodiment of this invention includes three main elements; the controlling device for the exhaust valve; the make and break igniter operating means; and the governor control for the butterfly valve of the intake manifold. Preliminary to the description of these elements, it may be well to emphasize the fact that while the present invention has been designed with particular reference to adapting it for application to a stationary engine of the horizontal cylinder type, has been illustrated, and will be hereinafter described, in that connection, it may, nevertheless, be applied with equal efficiency to any other type of gas engine.

In the engine illustrated, the base, cylinder, piston, fly-wheel, crank-shaft, and connecting rod are respectively designated by the numerals 10, 11, 12, 13, 14 and 15. The intake valve, which is of the puppet type and is designated as an entirety by the numeral 16, operates on the suction principle and is not in the preferred embodiment of this invention equipped with any mechanical operating means. The exhaust valve, designated as an entirety at 17, is, however, mechanically operated, and for this purpose a rocker arm 18 is pivotally connected at one terminal to the valve stem 19 of the member 17 and is similarly pivoted at its other terminal as at 20 to a cam controlled push rod 21 and fulcrumed at an approximate central point, as at 22, to a laterally extending arm 23 formed integral with or suitably secured to the wall of the cylinder 11, or to the engine bed.

The member 21 extends transversely of the cylinder and across the upper portion thereof, being slidably mounted in a supporting frame 24 which is either formed integrally with or suitably secured to the upper portion of the cylinder, as may be found most desirable. The free terminal of the member 21 carries a roller 25 which is arranged for engagement by a face cam 26 formed on a gear wheel 27 concentrically mounted on a stub axle 28 which is secured to the frame 24 in any suitable manner. This gear wheel 27 is preferably of the spur tooth type, and is driven by a silent link chain 29 which works over a gear wheel 30 keyed on the crank shaft 14. An adjustable idler 31 is provided for the obvious purpose of adjusting the tension of the chain 29. Relative to the chain 29, reference is had particularly to Fig. 6 in which it will be seen that the chain employed is preferably of the pivoted plate link type. This chain has been found to be highly efficient when used for purposes of the present nature and is, therefore, introduced in this invention in order to attain the highest possible efficiency, in the operation of the several parts.

Digressing briefly from the description of the more essential features of this invention, it is to be noted that an eccentrically threaded gear wheel 32 is arranged to drive the plunger rod 33 of the gasolene pump 34 which is connected in the usual manner to an overflow reservoir for the purpose of maintaining a constant level in the carbureter illustrated conventionally at 35.

Coming now to the description of the controlling mechanism employed in operating the make and break igniter, there has been provided a pin or stud 36 which projects laterally from the inner face of the gear 24 and is disposed eccentrically thereof. This pin 36 is arranged to contact once during every revolution of the gear wheel with the depending arm 37 of the movable electrode 38 of the make and break igniter, the head plate of which is designated as an entirety by the numeral 39. This make and break igniter may be of any desired type, it being essential, however, that the movable electrode be provided with an exteriorly disposed extension so that the depending arm 37 may be arranged for engagement by the pin 36. From the foregoing, it will be seen that once during every revolution of the gear wheel 27, the exhaust valve 17 will be opened, and the ignition of the gases in the cylinder produced by the contact of the face cam 26 and the pin 36, respectively, with the roller 25 and the depending arm 37.

The exhaust and ignition controlling devices being thus disclosed, the ball governor and associated mechanism employed in automatically controlling the butterfly valve 40 will be next described. This mechanism includes a ball governor designated as an entirety by the numeral 42, a governor rod 43 driven by the gear wheel 27, and the several connecting links and levers employed in transmitting the movement of the yoke to the butterfly valve. The governor includes a yoke 44 which is slidably mounted upon the governor rod 43 and is formed with a pair of laterally extending apertured ears 45 and 46 to which the ball arms 47 and 48 are pivotally connected. A fixed collar 49 is carried terminally of the bracket arm 50 and receives the lower terminal of the governor rod, and also receives the fixed pivoted terminals of the stay arms 51 and 52 which are pivoted at their outer terminals to points intermediate the length of the members 47 and 48, as at 53 and 54. The upper terminal of the governor rod 43 is journaled in a bearing 55 which is formed integrally with the outer end of a bracket arm 56 and carries a keyed pivoted pinion 57 arranged to mesh with the pivoted face teeth 58 of the cam gear 27.

From the foregoing it will be obvious that the position of the governor yoke 42 will be controlled by the speed at which the fly wheel of the engine is rotated inasmuch as the cam wheel 27 is positively driven from the crank-shaft through the medium of the chain 29. As a means, therefore, for connecting the yoke 42 to the butterfly valve 40 so that the opening and closing of this valve will be automatically governed by the speed of the engine, there has been provided a link lever 59 pivoted to a second link 60 which is connected in like manner as at 61 to a link 62 which is keyed to the valve stem 63 of the member 40. Obviously, as the speed of the engine increases, the outward movement of the ball arms of the governor and the resultant downward movement of the governor yoke will, through the medium of the several connecting levers and links, operate to gradually close the intake manifold.

The actual construction and arrangement of the various elements of this invention being thus described, it now remains to direct particular attention to the fact that the present invention has simplified the construction of the valve ignition controlling mechanism by eliminating all gear wheels, chain drives, and cams which can be done away with without impairing the efficiency of the operation of the device.

In reduction to practice, we have found that the form of our invention, illustrated in the drawings and referred to in the above description as the preferred embodiment, is the most efficient and practical; yet realizing that the conditions concurrent with the adoption of our device will necessarily vary, we desire to emphasize the fact that various minor changes in details of construction, proportion and arrangement of parts may be resorted to, when required, without sacrificing any of the advantages of our invention, as defined in the appended claims.

What we claim is:—

1. A speed regulating mechanism for internal combustion engines including in combination a timing wheel, and means controlled thereby for operating an exhaust valve, controlling the ignition, and throttling the charge of the engine.

2. A speed regulating mechanism for internal combustion engines including in combination a timing wheel adapted to control the ignition and exhaust of the engine and to throttle the charge, and means operatively connecting the timing wheel to the crank shaft of the engine.

3. A speed regulating mechanism for internal combustion engines including in combination a timing wheel, an exhaust cam, an igniter trip carried thereby, a speed controlled governor actuated from said timing wheel, a charge throttling device, and means operatively connecting the governor with said throttling device.

4. A speed regulating mechanism for internal combustion engines including a timing wheel, an exhaust cam, a rocker arm connected to the exhaust valve of the engine, a slidably mounted push rod connected to said rocker arm, and a roller carried on the free terminal of the rod and arranged for engagement by said cam.

5. A speed regulating mechanism for internal combustion engines including a timing wheel, an exhaust cam formed integral with the timing wheel, an igniter trip carried by said wheel, a speed controlled governor operatively connected to the timing wheel, and means connecting the governor to the engine throttle for throttling the charge of the engine.

6. The combination with a gas engine, of an exhaust controlling mechanism including a wheel journaled at the side of the engine and provided with a face cam, a push rod slidable transversely with respect to the engine, said push rod having a terminal roller adapted to be engaged by the said cam, and a rocker arm pivoted at one terminal to the push rod and at the other terminal to the stem of the exhaust valve.

7. The combination with a gas engine, of an exhaust valve controlling mechanism including a transversely movable push-rod, pivoted means freely connecting the push rod to the exhaust valve, and a timing wheel driven from the crank shaft and engine, said timing wheel having a face cam adapted to engage the push rod for operating the valve rod.

8. The combination with a gas engine, of a transversely slidable push rod operatively connected to the valve, a timing wheel driven from the crank shaft, a cam carried by the timing wheel engageable with the push rod for operating the exhaust valve, a vertically disposed shaft arranged adjacent the timing wheel, a pinion operatively connecting the timing wheel and said shaft, a centrifugal governor mounted on the shaft, and means connecting the governor with the butterfly valve of the intake manifold, whereby the governor regulates the throttling of the engine in accordance with the load upon the crank shaft.

9. The combination with a gas engine, of a controlling mechanism including in combination a timing wheel journaled at one side of the engine and driven by the crank shaft thereof, a laterally extending pin carried by the wheel, a face cam formed on the wheel, a make and break sparking device having its movable electrode provided with an arm which is arranged in the path of said pin, a transversely slidable push rod mounted on the engine and operably connected to the exhaust valve thereof, said push rod being engageable by the face cam for opening the exhaust valve, a vertically disposed shaft arranged adjacent the timing wheel and operably connected thereto, a centrifugal governor carried by the shaft, and means operably connecting the governor to the throttle.

In testimony whereof we affix our signatures in presence of two witnesses.

CHARLES A. STAPLETON. [L. S.]
OTHA P. BURCHFIEL. [L. S.]

Witnesses:
J. L. MELANEY,
J. G. CAMPBELL.